(12) United States Patent
Feng et al.

(10) Patent No.: US 11,436,426 B2
(45) Date of Patent: Sep. 6, 2022

(54) ELECTRONIC TAG AND CONTROL METHOD THEREOF, SYSTEM INCLUDING ELECTRONIC TAG AND CONTROL METHOD THEREOF

(71) Applicant: BOE TECHNOLOGY GROUP CO., LTD., Beijing (CN)

(72) Inventors: Feng Feng, Beijing (CN); Zhiguo Zhang, Beijing (CN); Zhusong Yi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 524 days.

(21) Appl. No.: 16/468,153

(22) PCT Filed: Dec. 14, 2018

(86) PCT No.: PCT/CN2018/121182
§ 371 (c)(1),
(2) Date: Jun. 10, 2019

(87) PCT Pub. No.: WO2019/153886
PCT Pub. Date: Aug. 15, 2019

(65) Prior Publication Data
US 2021/0365653 A1    Nov. 25, 2021

(30) Foreign Application Priority Data
Feb. 6, 2018 (CN) .......................... 201810117293.X

(51) Int. Cl.
G06K 7/14 (2006.01)
G06K 7/10 (2006.01)
G09F 3/20 (2006.01)

(52) U.S. Cl.
CPC ....... *G06K 7/1443* (2013.01); *G06K 7/10376* (2013.01); *G06K 7/1413* (2013.01); *G06K 7/1417* (2013.01); *G09F 3/208* (2013.01)

(58) Field of Classification Search
CPC .. G06K 7/1443; G06K 7/1413; G06K 7/1417; G06K 7/10376; G09F 3/208
See application file for complete search history.

(56) References Cited

U.S. PATENT DOCUMENTS

2006/0149635 A1* 7/2006 Bhatti .................. G06Q 20/208
                                                             705/23
2009/0289936 A1    11/2009 Sheedy et al.
(Continued)

FOREIGN PATENT DOCUMENTS

CN    101611431 A    12/2009
CN    101794402 A    8/2010
(Continued)

OTHER PUBLICATIONS

Search Report and Written Opinion, dated Mar. 18, 2019, issued in counterpart International Application No. PCT/CN2018/121182 (13 pages; in English).
(Continued)

*Primary Examiner* — Matthew Mikels
(74) *Attorney, Agent, or Firm* — WHDA, LLP

(57) ABSTRACT

The present disclosure generally relates to the field of electronic tagging technology. An electronic tag may include a scanner configured to scan an article identification information associated with one of a plurality of categories of articles; a controller configured to acquire the article identification information from the scanner; a communicator configured to, based on a pairing of the article identification information with an identification information associated with the electronic tag, acquire a product information corresponding to the article identification information; a storage
(Continued)

unit configured to store the identification information associated with the electronic tag; and a display screen configured to display the product information corresponding to the article identification information.

18 Claims, 16 Drawing Sheets

(56) References Cited

U.S. PATENT DOCUMENTS

| | | | |
|---|---|---|---|
| 2011/0123198 A1* | 5/2011 | Nilsson | G06Q 30/00 398/108 |
| 2013/0168444 A1* | 7/2013 | Hsieh | G06F 3/14 235/375 |
| 2014/0158846 A1 | 6/2014 | Nicolis | |
| 2014/0353368 A1* | 12/2014 | Connolly | H04W 52/0229 235/375 |
| 2018/0025187 A1 | 1/2018 | Suzuki | |
| 2018/0204487 A1 | 7/2018 | Bao | |

FOREIGN PATENT DOCUMENTS

| | | |
|---|---|---|
| CN | 202736436 U | 2/2013 |
| CN | 104239944 A | 12/2014 |
| CN | 204557535 U | 8/2015 |
| CN | 106203227 A | 12/2016 |

OTHER PUBLICATIONS

Office Action dated Aug. 20, 2020 issued in counterpart Chinese Application No. 201810117293.X (w/ English machine translation; 24 pages).

Office Action dated Dec. 4, 2019 issued in counterpart Chinese Application No. 201810117293.X (w/ English machine translation; 23 pages).

Office Action dated May 8, 2021, issued in counterpart Chinese Application No. 201810117293.X (w/ English machine translation; 41 pages).

* cited by examiner

ELECTRONIC TAG AND CONTROL METHOD THEREOF, SYSTEM INCLUDING ELECTRONIC TAG AND CONTROL METHOD THEREOF

CROSS-REFERENCE TO RELATED APPLICATIONS

This application claims benefit of the filing date of Chinese Patent Application No. 201810117293.X filed on Feb. 6, 2018, the disclosure of which is hereby incorporated in its entirety by reference.

TECHNICAL FIELD

This disclosure relates generally to electronic tagging technology, and particularly, to an electronic tag, a method for controlling an electronic tag, a system including an electronic tag, and a method for controlling a system including an electronic tag.

BACKGROUND

With the development of smart retail technology, electronic tags (for example, an electronic price tag) are increasingly replacing the traditional paper tags and becoming widespread in their use in various retail and commercial environments, for example, in supermarkets.

BRIEF SUMMARY

One embodiment of the present disclosure is an electronic tag. The electronic tag may comprise a scanner configured to scan an article identification information associated with one of a plurality of categories of articles; a controller configured to acquire the article identification information from the scanner; a communicator configured to, based on a pairing of the article identification information with an identification information associated with the electronic tag, acquire a product information corresponding to the article identification information a storage unit configured to store the identification information associated with the electronic tag; and a display screen configured to display the product information corresponding to the article identification information.

In some embodiments, the storage unit may be further configured to store the article identification information and the corresponding product information.

In some embodiments, each of the plurality of categories of articles may be paired with a single identification information of an electronic tag.

In some embodiments, the electronic tag may further comprise a housing. The display screen may be provided on an outer surface on a viewer's side of the housing. The controller, the communicator, and the storage unit may be inside the housing.

In some embodiments, the electronic tag may further comprise a slit on the outer surface on the side of the housing opposite from the display screen. The scanner may be inside the housing and a position of the scanner may correspond to a position of the slit.

In some embodiments, the electronic tag may further comprise a transparent protective layer covering the slit.

In some embodiments, the electronic tag may further comprise a timer chip configured to measure time, and based on a predetermined time, to cause the controller to enter the electronic tag into a power-saving mode.

In some embodiments, the scanner may be configured to scan a bar code or a two-dimensional code. The communicator may comprise a bluetooth chip. The display screen may comprise an electronic ink screen.

In some embodiments, the identification information associated with the electronic tag may be customizable.

Another embodiment of the present disclosure is an electronic tag system. The electronic tag system may comprise an electronic tag as described above; a server, and a gateway. The communicator may be configured to communicate with the server through the gateway, and to transmit the article identification information and the identification information associated with the electronic tag to the server, so that the article identification information may be paired with the identification information associated with the electronic tag and the product information corresponding to the article identification information may be acquired.

Another embodiment of the present disclosure is a method of controlling an electronic tag, which electronic tag may be as described above. The method may comprise acquiring a second article identification information associated with one of a plurality of categories of articles; pairing the second article identification information with an updated identification information associated with the electronic tag; based on the pairing, acquiring a second product information corresponding to the second article identification information; and displaying the second product information on the display screen.

In some embodiments, the method may further comprise storing the second article identification information and the second product information corresponding to the article identification information in the storage unit.

In some embodiments, the method may further comprise creating a backup of a first article identification information previously paired with the identification information associated with the electronic tag, and a first product information corresponding to the first article identification information; if the second product information is successfully acquired, storing the second article identification information and the corresponding second product information in the storage unit; and if the second product information is not successfully acquired, displaying an error message on the display screen, deleting the second article identification information, and then after a predetermined time interval, displaying the first product information on the display screen.

In some embodiments, the method may further comprise, after the display screen displays the second product information, entering the electronic tag into a power-saving mode according to a predetermined timing in the timer chip.

In some embodiments, the method may further comprise, before acquiring the second article identification information, determining whether the electronic tag is in a power-saving mode. If the electronic tag is in the power-saving mode, the method may be paused. If the electronic tag is not in the power-saving mode, the second article identification information may be acquired.

Another embodiment of the present disclosure is a method of controlling an electronic tag system, which electronic tag system may be as described above. The method may comprise acquiring an article identification information associated with one of a plurality of categories of articles; transmitting the article identification information and an identification information associated with the electronic tag to the server; pairing the article identification information with an identification information associated with the electronic tag; based on the pairing, acquiring a product information corresponding to the article identification information; and displaying the second product information on the display screen.

In some embodiments, the method may further comprise modifying the identification information associated with the electronic tag; transmitting the modified identification information from the server to the electronic tag via the gateway; replacing the identification information associated with the electronic tag with the modified identification information.

In some embodiments, the method may further comprise before acquiring the article identification information, determining whether the electronic tag is in a power-saving mode, and if the electronic tag is in the power-saving mode, waking the electronic tag up through the server.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

A numerical range modified by "approximately" herein means that the upper and lower limits of the numerical range can vary by 10% thereof. A number modified by "approximately" herein means that the number can vary by 10% thereof.

Conventional electronic tag technology can be inconvenient when pairing an electronic tag with the corresponding identification (ID) information. For example, when the electronic tag is an electronic price tag, conventional technologies make it a hassle to pair a price tag with the corresponding goods. The pairing process can be time-consuming and error-prone, especially when used in a large-scale commercial context (for example, a supermarket). Any pairing during initial stocking and any subsequent relocation of goods must be done manually, which can be inefficient.

Figure 1:
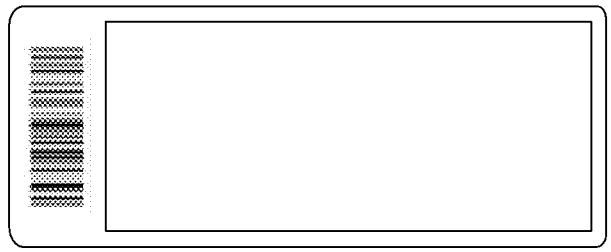
FIG. 1 shows a schematic diagram of a conventional electronic tag.
Figure 2:
FIG. 2 shows a schematic diagram of a front view of an electronic tag according to an embodiment of the present disclosure.

A solution commonly used by electronic tag manufacturers is to develop a personal digital assistant (PDA) which can be integrated with additional capabilities such as bluetooth, camera, and wireless fidelity (WiFi). A barcode is provided for an electronic tag (for example, as shown in FIG. 1), and the identification information corresponding to the electronic tag is recorded via the barcode. The barcode on the electronic tag and a barcode of the corresponding goods are scanned using the PDA, which is then connected with a server for pairing. Even though the use of PDA may address the problem of manual processing, it increases cost and operation complexity. Moreover, if the identification information of the electronic tag is replaced, the barcode on the label would need to be re-printed, causing further inefficiency and waste.

As shown in FIGS. 2 to 5, the electronic tag 01 includes a housing 10 and a display screen 20 on the housing 10. The display screen 20 is provided on an outer surface 11 on the viewer's side of the housing 10. The housing 10 is provided with a scanner 30 that is configured to scan the article identification information associated with a product.

The design and construction of the scanner 30 are not particularly limited. The scanner 30 may adopt any appropriate configuration known a person of ordinary skill in the art depending on need. For instance, when the electronic tag 01 is installed on a shelf, for example, in a supermarket, the size of the electronic tag 01 is limited by the shelf space. As such, a scanner 30 having small dimensions may be desirable. In addition, the location of the scanner 30 with respect to the housing 10 is not particularly limited, provided that the scanner 30 is capable of performing the scanning functions. Further, in some embodiments, the scanner 30 may comprise a bar code scanner, a two-dimensional code scanner, and the like, depending on the configuration of the article identification information.

Figure 5:
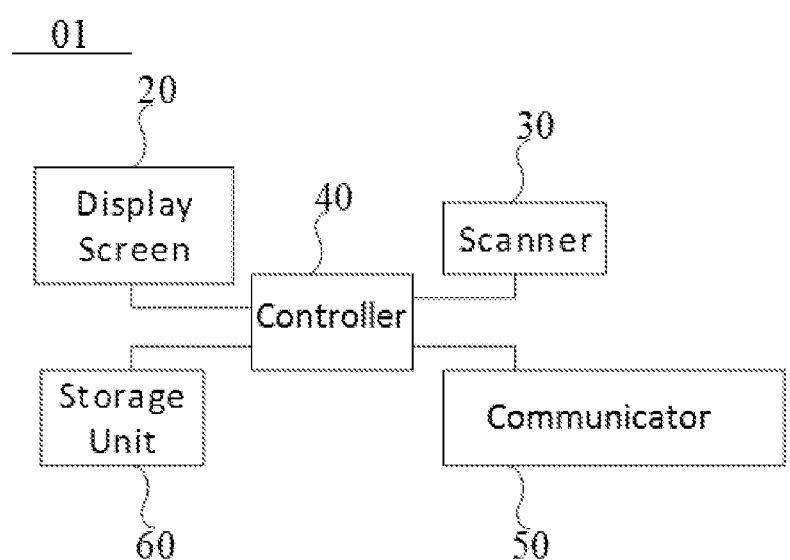
FIG. 5 shows a schematic diagram of an electronic tag according to an embodiment of the present disclosure.

The electronic tag 01 further includes a controller 40, a communicator 50 and a storage unit 60. As shown in FIG. 5, the controller 40 is configured to control the display screen 20, the scanner 30, the storage unit 60, and the communicator 50. The controller 40 is configured to communicate with the scanner 30 and to acquire the article identification information based on a scan by the scanner 30. The controller 40 may comprise a microcontroller unit (MCU), for example, a STM32 serial microcontroller and the like The storage unit 60 is configured to store the identification information corresponding to a plurality of electronic tags. The storage unit 60 may comprise an electrically erasable programmable read-only memory (EEPROM).

The communicator 50 is configured to pair the article identification information with the identification information associated with the electronic tag, and communicate with a server to obtain information relating to the product corresponding to the article identification information based on the result of the pairing. In some embodiments, the communicator 50 may comprise a bluetooth chip, a WiFi chip, and the like.

Figure 6A:
FIG. 6A shows a schematic diagram of content of a display on an electronic tag according to an embodiment of the present disclosure.
Figure 6B:
FIG. 6B shows an English-language counterpart to FIG. 6A.

The display screen 20 is configured to display the product information. For example, if the electronic tag 01 is applied to a supermarket context, as shown in FIGS. 6A and 6B, then the display screen 20 of the electronic tag 01 can display product information, including, for example, the name of the product, place of production, specification, grade, unit, price, product identification, length of special promotions, and the like. The display screen 20 may comprise an electronic ink (e ink) screen. Since bluetooth chip and electronic ink screen have low power consumption, the total power consumption of the electronic tag 01 may be minimized.

The article identification information may comprise a barcode, a two-dimensional code, and the like. The article identification information is provided on the packaging of the product or directly on the product.

Figure 3:
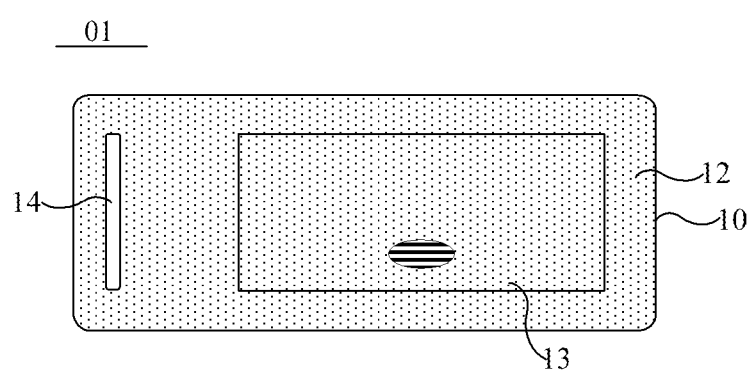
FIG. 3 shows a schematic diagram of a rear view of an electronic tag according to an embodiment of the present disclosure.
Figure 4:
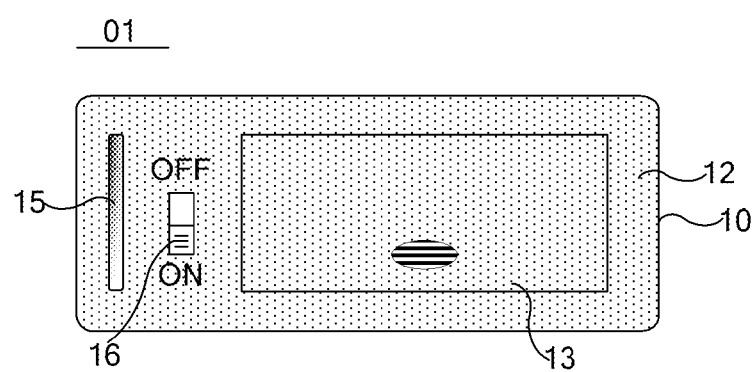
FIG. 4 shows a schematic diagram of a rear view of an electronic tag according to an embodiment of the present disclosure.

The electronic tag 01 further includes a power source. The power source may be a battery and the like, so as to impart the electronic tag 01 with mobility. In some embodiments, the power source may comprise a button battery. For example, as shown in FIGS. 3 and 4, a detachable rear cover 13 is provided on the back surface 12 of the housing 10, so that the power source such as battery may be replaced with ease.

The housing 10 may be transparent or non-transparent. The material for forming the housing is not particularly limited, and may be any appropriate material known to a person of ordinary skill in the art depending on need. The housing 10 is formed with a cavity. The display screen 20, the scanner 30 and the like are fixed to the housing 10.

Each electronic tag 01 is associated with an identification information. Different electronic tags 10 are associated with different identification information. The identification information for each electronic tag 01 may be stored in the storage unit 60.

Further, each electronic tag 01 is configurable and customizable. More particularly, the identification information for each electronic tag 01 may be modified, updated, and customized as appropriate. As an example, if a first electronic tag corresponds to products in category A, the identification information of the first electronic tag is configured to display the product information relating to products in category A. When the first electronic tag is relocated to the area for products in category B, the product information for which constitutes the second electronic tag, then the identification information of the first electronic tag may be modified to correspond to that of products in category B. That is, the first electronic tag is effectively converted into the second electronic tag. As such, the product information for products in category B can be displayed by the first electronic tag after relocation to the area designated for products in category B.

In an electronic tag 01 according to the present disclosure, the electronic tag identification information is stored in the storage unit 60. When pairing the electronic tag, the scanner 30 of the electronic tag 01 scans the article identification information, and the article identification information is paired with the identification information for the electronic tag. The article identification information, as well as information relating to the product corresponding to the paired article identification information, is displayed on the display screen 20.

Since the identification information of the electronic tag is stored inside the electronic tag (for example, in the storage unit), the present disclosure obviates the need to separately affix printed or paper identification information for the electronic tag on the housing of the electronic tag, which can save cost and simplify manufacturing. Further, by internalizing the identification information for the electronic tag, the inside of which is not visible to a user, the present disclosure makes it possible to minimize the risk of a user mistakenly scanning the electronic tag's identification information, instead of the article identification information. In addition, the operation of an electronic tag according to the present disclosure is simple. Using an electronic tag according the present disclosure to identify a product also allows reuse of an existing network of "server-gateway-electronic tag". After the electronic tag identification information and the article identification information are successfully paired with each other, the product information in the server can be immediately updated and displayed on the display screen 20 of the electronic tag.

In some embodiments, the storage unit 60 is further configured to store the article identification information and the product information corresponding to the article identification information. The product information is acquired by the communicator 50. The identification information of each type of products corresponds to one electronic tag identification information.

When article identification information (that is, "new" article identification information) is input into the electronic tag, the article identification information is paired with the identification information of the corresponding electronic tag. Before inputting the new article identification information, a backup is created for the article identification information that was previously paired with the electronic tag (that is, "prior" article identification information), and the product information that corresponded to the "prior" article identification information. The communicator 50 acquires the product information corresponding to the "new" article identification information, which is then stored in the storage unit 60. The backup copy of the "prior" article identification information and the corresponding product information can then be deleted. In some embodiments, the "prior" article identification and the corresponding product information are deleted at the time of inputting the "new" article identification information, that is, without waiting for the communicator 50 to acquire the pertinent product information.

The product information displayed by display screen 20 is the product information corresponding to the article identification information stored in the storage unit 60 and corresponding to the identification information of the electronic tag.

Storing article identification information in an electronic tag 01 according to the present disclosure can increase the convenience and accuracy of using smart shelf technology, for example, by removing reliance on computers to visually identify goods, which can in turn improve the recognition success rate. Moreover, since article identification and the corresponding product information are stored in the electronic tag, users can communicate with the electronic tag 01 through a terminal device, such as a mobile phone, to quickly and efficiently obtain the sought-after product information. This interactive technology enables additional capabilities, such as on line services including on-line price comparison, on-line ordering, and the like, that can greatly enhance user experience.

In some embodiments, the housing 10 is provided with a slit 14, for example, as shown in FIG. 3. The slit 14 may be formed in the back surface of the housing 10, that is, on a side of the housing 10 opposite from the viewer's side. In some embodiments, the slit 14 is formed in the back surface 12 of the housing 10. This arrangement can maximize the amount of space on the front surface of the housing 10, that is, on the viewer's side of the housing 10, that is available for the display screen 20. More particularly, by forming the slit 14 on the back surface 12 of the housing 10, the size of the display screen 20 is limited only by the frames surrounding the screen.

The position of the slit 14 on the housing 10 corresponds to the position of the scanner 30. The scanner 30 scans the article identification information through the slit 14, so that the scan is not influenced by the material of the housing 10 (for example, some materials may be more susceptible to light leaks, which can cause noises in the scan; some materials may be more susceptible to warping, which can cause distortions in the scan).

In some embodiments, to protect the scanner 30, the slit 14 can be provided with a transparent protective layer 15, for example, as shown in FIG. 4. The transparent protective layer is configured to be complementary with the slit 14. The transparent protective layer 15 is fixed to the housing 10. In some embodiments, the transparent protective layer 15 is made of glass.

In some embodiments, the electronic tag includes a switch. The switch 16 is electrically coupled with the scanner 30 and is configured to control the scanner 30.

In some embodiments, the switch 16 may be a mechanical switch (for example, as shown in FIG. 4). The mechanical switch 16 may be arranged on the back surface 12 of the housing, so as to maximize the amount of space on the front surface of the housing 10 that is available for the display screen 20.

In some embodiments, the switch 16 may be an electronic switch. The switch 16 may be provided within the housing 10. The scanner 30 can be controlled without requiring direct contact with the electronic tag.

Through control of the switch, the scanner 30 is on when in use and off when not in use, thereby avoiding unnecessary power consumption.

Figure 7:
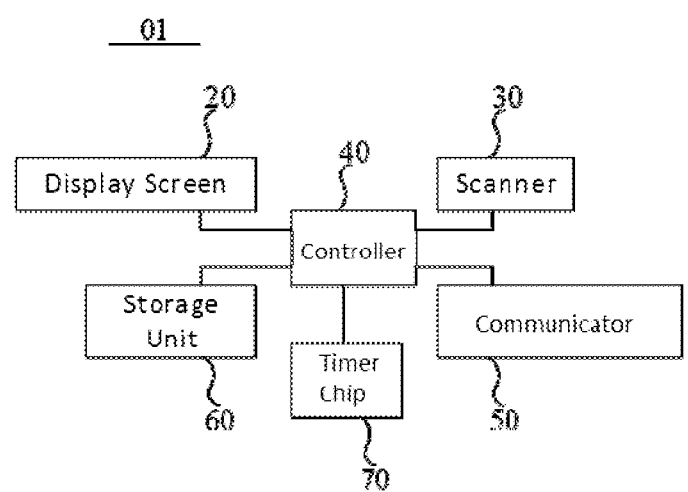
FIGS. 7-8 show schematic diagrams of electronic tags according to embodiments of the present disclosure.

The electronic tag 01 may further include a timer chip 70, for example, as shown in FIG. 7. The timer chip 70 is provided in the housing 10. The controller 40 is configured to enter the electronic tag 01 into a power-saving mode after the display screen 20 has displayed the appropriate product information corresponding to the article identification information, and when the timer chip 70 has reached the predetermined time. This configuration makes it possible to minimize power consumption by the electronic tag 01.

In the power-saving mode, all the units electrically coupled to the controller 40 are configured to enter a low-power-consumption state. For example, inn the power-saving mode, the display screen, timer chip, and power detection circuit may be the only components that are powered, so as to limit the amount of power being utilized.

A person of ordinary skill in the art would readily understand that the display screen 20 can be configured to continue to display the pertinent product information, even after the electronic tag 01 is in the power-saving mode.

The timer chip 70 may be configured to measure time in any appropriate intervals depending on use. The timer chip 70 may be configured to count down time, for example, by counting down from 5 minutes to zero. The timer chip 70 may also be configured to count up time, for example, by counting up from zero to 5 minutes. The starting time of the timer chip 70 may be set to the time when the display screen 20 displays the product information.

Figure 8:
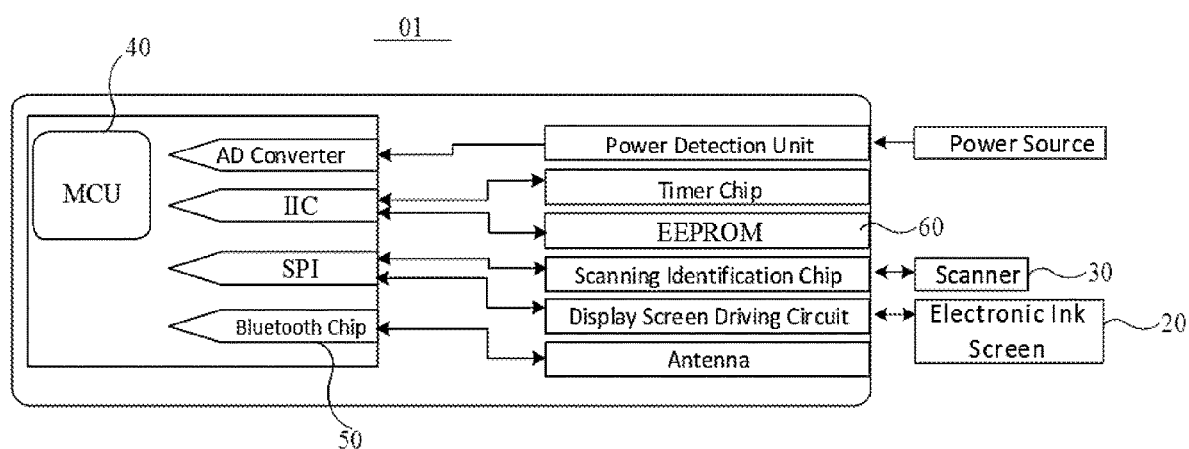

In some embodiments, the hardware for the electronic tag may adopt a hardware platform STM32, for example, as shown in FIG. 8. The controller 40 may comprise a microcontroller unit (MCU), for example, a STM32 serial microcontroller and the like. The communicator 50 may comprise a bluetooth chip, a WiFi chip, and the like. The storage unit 60 may comprise an electrically erasable programmable read-only memory (EEPROM). The display screen 20 may comprise an electronic ink screen.

The communicator 50 (comprising, for example, a bluetooth chip) is configured to communicate with, for example, a gateway, a terminal device, and the like, through an antenna. The display screen 20 (comprising, for example, an electronic ink screen) may be configured to be driven and displayed through a display screen driving circuit. The scanner 30 may be electrically coupled to a scanning identification chip, which is configured to identify the scanning result of the scanner 30 to obtain the article identification information.

The electronic tag may further include a power detection circuit, and the like. The power detection circuit is configured to detect the amount of power in the power source (for example, a battery). Moreover, the present embodiments further conserve power by configuring the power detection circuit to operate according to the predetermined schedule of the timer chip. In other words, it is not necessary for the power detection circuit to be consistently monitoring the power consumption.

The display screen driving circuit and the scanning identification chip may be electrically coupled to a serial peripheral interface (SPI). An electrically erasable programmable read-only memory (EEPROM) and the timer chip may be electrically coupled to an inter-integrated circuit (IC). The power detection circuit may be electrically coupled to an analog digital (AD) converter. The SPI, IIC, AD converter, and the bluetooth chip may be formed as an integrated unit of the controller (for example, a MCU).

Figure 9:
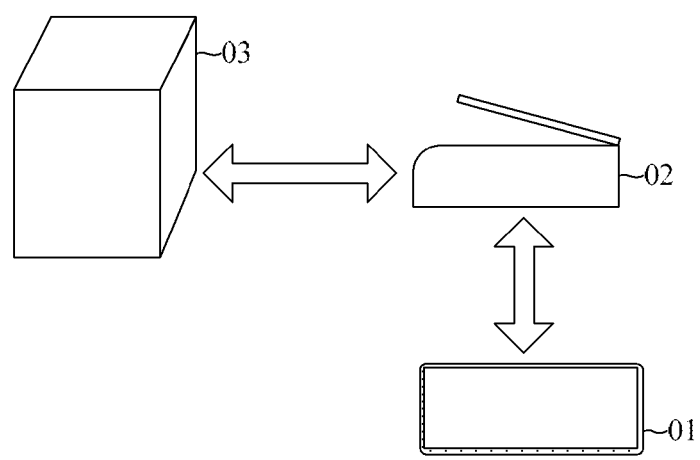
FIG. 9 shows a schematic diagram of an electronic tag system according to an embodiment of the present disclosure.

The present disclosure also provides electronic tag system. As shown in FIG. 9, an embodiment of an electric tag system according to the present disclosure includes an electronic tag 01 as described above, a gateway 02, and a server 03.

The communicator 50 is configured to communicate with the server 03 through the gateway 02 to send article identification information and identification information of the electronic tag to the server 03. The article identification information and the identification information of the electronic tag are paired in the server 03, and the product information corresponding to the article identification information may be subsequently obtained.

More particularly, after the controller 40 acquires the article identification information, the communicator 50 sends the article identification information and the identification information of the electronic tag to the gateway 02. The gateway 02 then sends the article identification information and the identification information of the electronic tag to the server 03. The server 03 is configured to pair the article identification information with the identification information of the electronic tag. Once the article identification information and the identification information of the electronic tag are paired, the server sends the product information corresponding to the article identification information to the gateway 02, which then sends the product information to the communicator 50.

In some embodiments, the communicator 50 comprises a bluetooth chip. The bluetooth ship and the gateway 02 may adopt bluetooth low energy (BLE) technology to perform communication. The gateway 02 and the server 03 may also communicate through WiFi.

Figure 10:
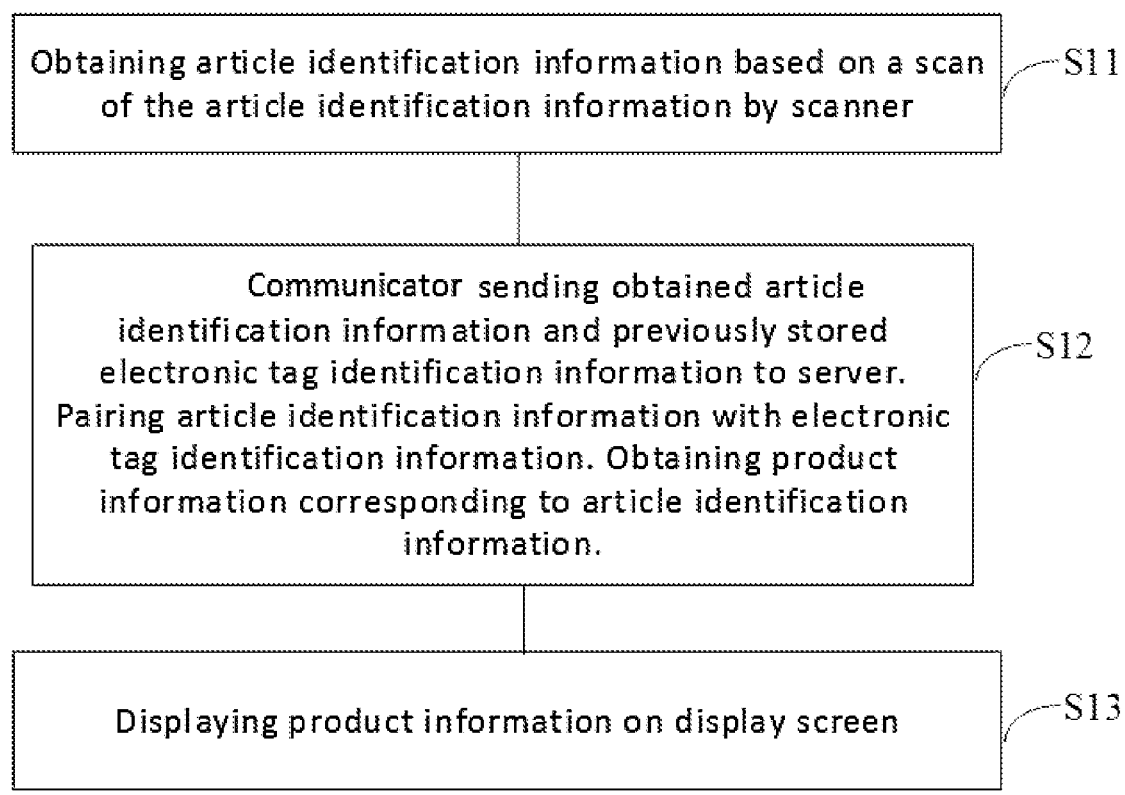
FIGS. 10-14 show flow charts of methods for controlling electronic tags according to embodiments of the present disclosure.

The present disclosure also provides a method of controlling the electronic tag 01. As shown in FIG. 10, the method includes the following steps:

In step S11, the article identification information is obtained by scanning the article identification information using the scanner 30.

In step S12, the communicator 50 sends the article identification information and the identification information of the electronic tag previously stored in the storage unit 60 are sent to the server 03. After the article identification information is paired with the corresponding identification information of the electronic tag, the product information corresponding to the article identification information is obtained.

In step S13, the obtained product information is displayed on the display screen 20.

After step S11 and before step S13, the display screen 20 may be reset, for example, the display screen 20 may be completely blacked out.

In some embodiments, the control method may further include storing the article identification information and the product information corresponding to the article identification information in the storage unit 60. The identification information of each type of products corresponds to one electronic tag identification information.

Figure 11:
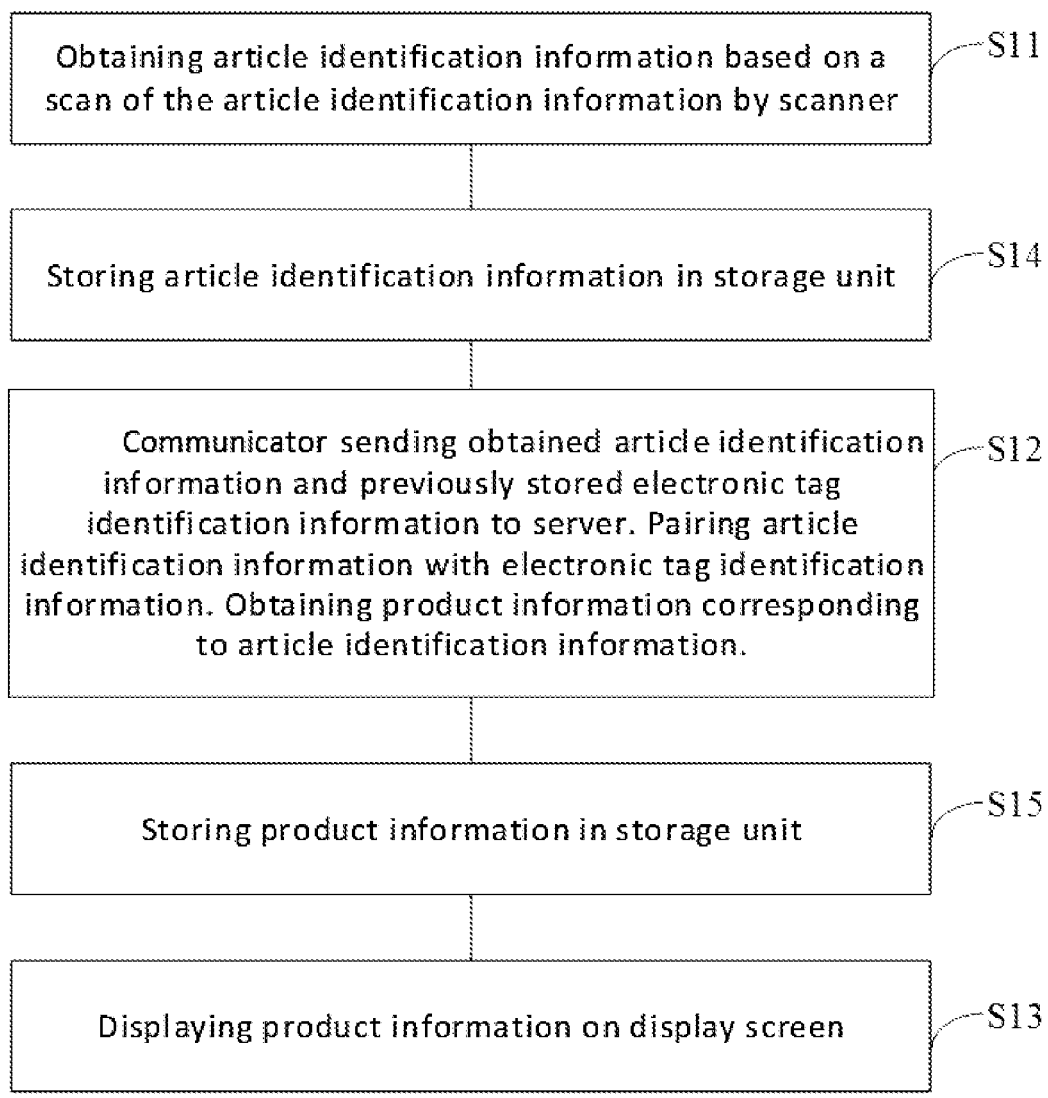

To store the article identification information and product information corresponding to the article identification information in the storage unit 60, the following steps may be performed. First, the article identification information is stored in the storage unit 60. Second, the product information corresponding to the article identification information is stored in the storage unit 60. As shown in FIG. 11, in step S14, after obtaining the article identification information in step S11, the article identification information is stored in the storage unit 60. Then, after the product information corresponding to the article identification information is obtained in step S12, the product information is stored in the storage unit 60 is stored in step S15.

Storing article identification information in an electronic tag 01 according to the present disclosure can increase the convenience and accuracy of using smart shelf technology, for example, by removing reliance on computers to visually identify goods, which can in turn improve the recognition success rate. Moreover, since article identification and the corresponding product information are stored in the electronic tag, users can communicate with the electronic tag 01 through a terminal device, such as a mobile phone, to quickly and efficiently obtain the sought-after product information. This interactive technology enables additional capabilities, such as on line services including on-line price comparison, on-line ordering, and the like, that can greatly enhance user experience.

Figure 12:
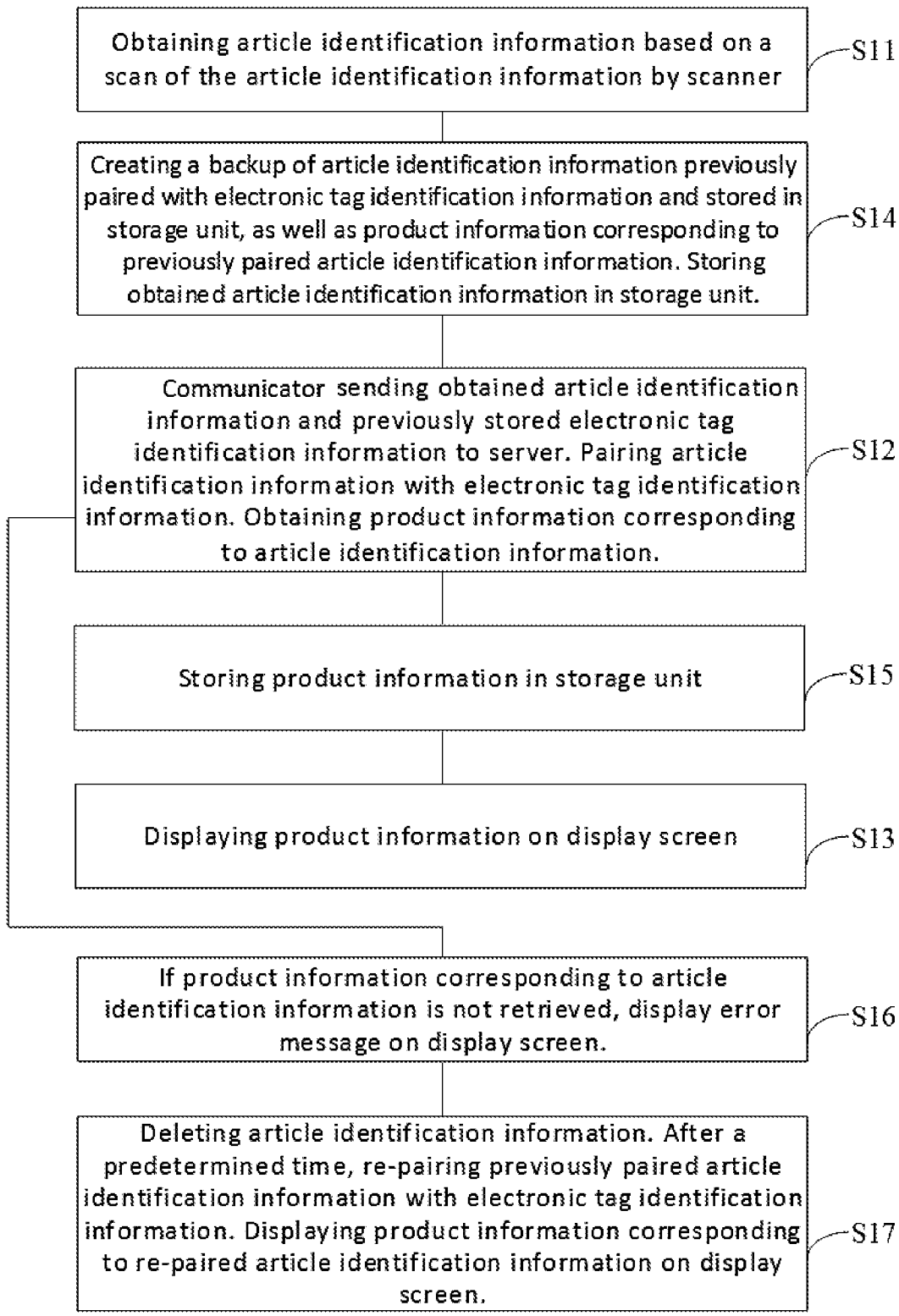

In some embodiments, as shown in FIG. 12, the article identification information is stored in the storage unit 60. When the storage unit 60 contains previously stored article identification information (that is, "prior" article identification information) that was previously paired with the electronic tag, a backup is created for that "prior" article identification information, as well as the product information that corresponded to the "prior" article identification information. Then, the article identification information (that is, "new" article identification information) obtained in step S11 is stored in the storage unit 60.

The backup copy of the "prior" article identification information and the corresponding product information can then be deleted. In some embodiments, the "prior" article identification and the corresponding product information are deleted at the time of storing the "new" article identification information, that is, without waiting for the pertinent product information corresponding to the article identification information.

As shown in FIG. 12, the control method may further include the following steps:

In step S16, if the product information corresponding to the article identification information is not acquired, the display screen 20 is configured to display an error message.

In step S17, the article identification information obtained in step S11 is deleted. After a predetermined amount of time, the "prior" article identification information is paired with the identification information of the electronic tag, and the display screen 20 is configured to display the product information corresponding to the "prior" article identification information.

More particularly, if the communicator 50 does not acquire the product information corresponding to the "new" article identification information obtained in step S11, the display screen 20 is configured to display a corresponding error message. The "new" article identification information is deleted, and after a predetermined amount of time, the "prior" article identification information, which was previously paired with the identification information of the electronic tag, is paired again with the electronic tag. The display screen 20 then displays the product information corresponding to the "prior" article identification information.

Thus, in the embodiments according to the present disclosure, the "prior" article identification information previously paired with the identification information of the electronic tag is backed up, together with the product information corresponding to the "prior" article identification information. If the communicator 50 fails to acquire the product information corresponding to the "new" article identification information, the product information corresponding to the "prior" article identification information can still be displayed on the display screen.

Figure 13:
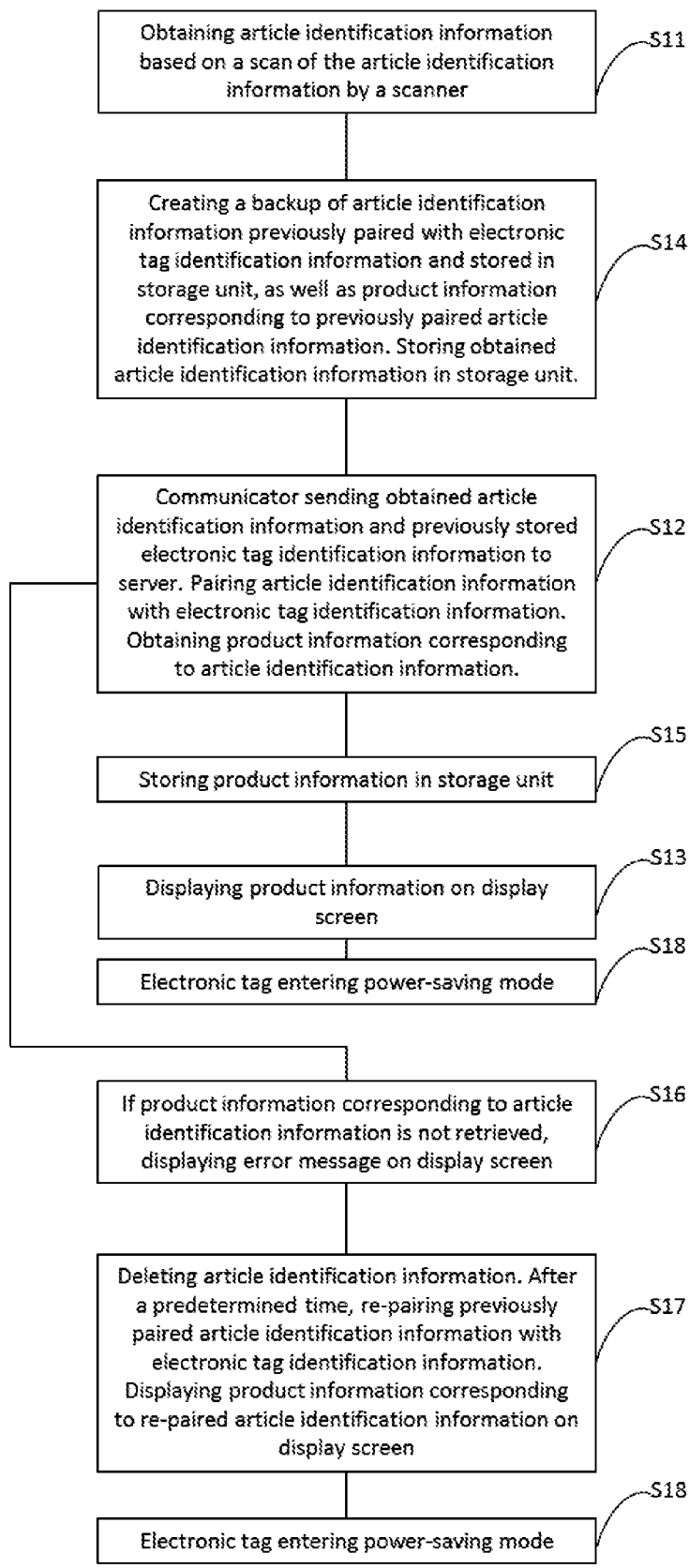

In some embodiments, for example, as shown in FIG. 13, the control method may further include the following step:

In step S18, after the display screen 20 displays the product information (that is, the product information corresponding to the article identification information obtained in step S11), and when the timer chip 70 has reached the predetermined time, the electronic tag 01 is configured to enter a power-saving mode. This can minimize the power consumption of the electronic tag.

Figure 14:
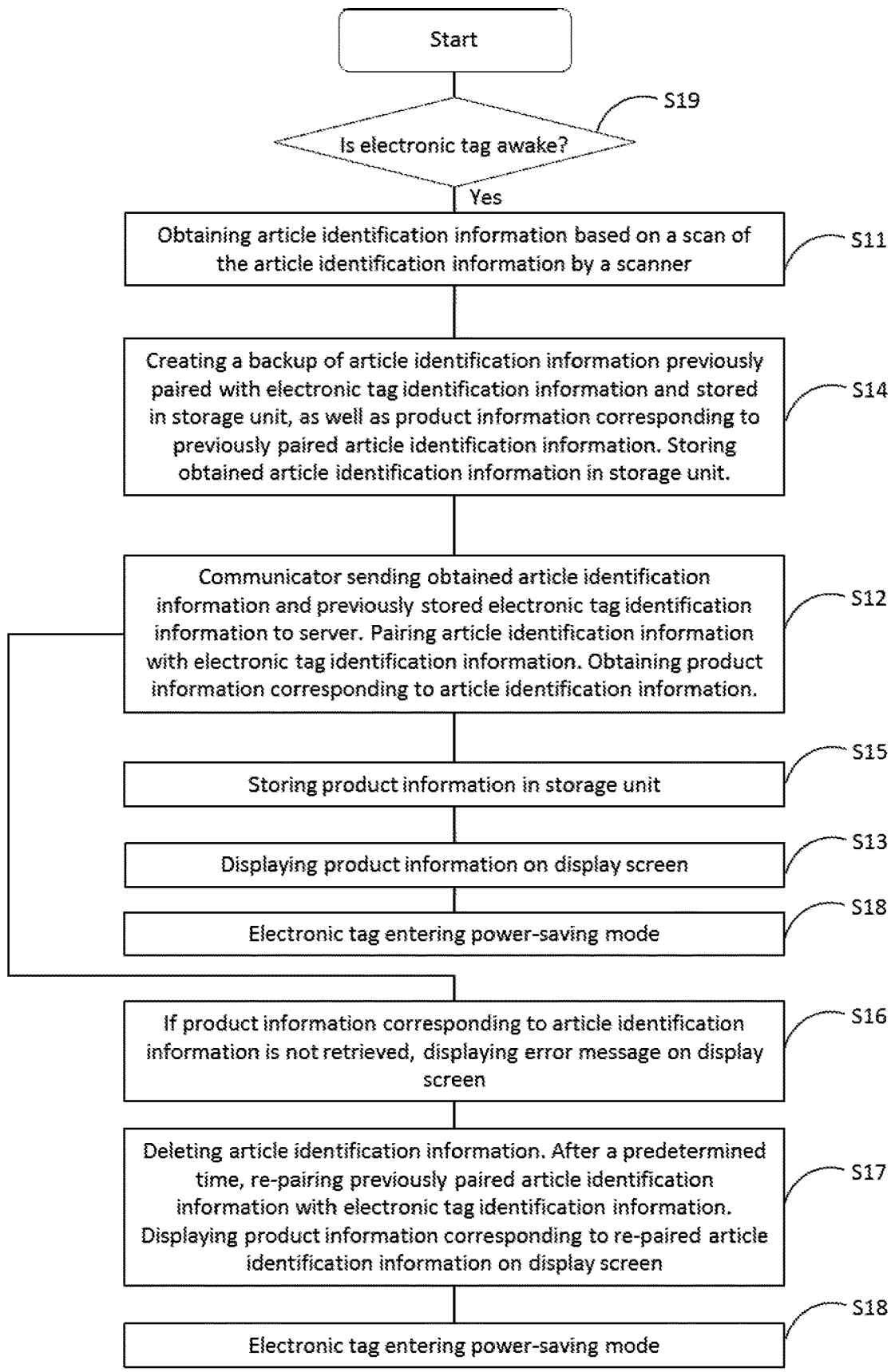

As shown in FIG. 14, before step S11, the control method may further include the following steps:

In step S19, a determination is made as to whether the electronic tag is "awake", that is, whether the electronic tag is in the power-saving mode. If the electronic tag is "awake", then the control method proceeds to step S20, in which the scanner 30 is configured to scan the article identification. On the other hand, if the electronic tag is not "awake", the control method is paused and does not proceed. Further, a user (for example, an authorized administrator) may wake up the electronic tag.

The control method according to the present disclosure reduces the risk of misoperation by users other than an authorized administrator of the electronic tag. When operation of the electronic tag needs to be resumed, the authorized administrator can wake the electronic tag from power-saving mode.

The present disclosure also provides a method of controlling an electronic tag system as described above. The method of controlling an electronic tag system includes the method of controlling the electronic tag, as described above. The communicator 50 in the electronic tag 01 is configured to communicate with the server 03 through the gateway 02, so that the article identification information and the identification information of the electronic tag are sent to the server 03. The article identification information is paired with the identification information of the electronic tag in the server 03. The product information corresponding to the article identification information is obtained.

Figure 15:
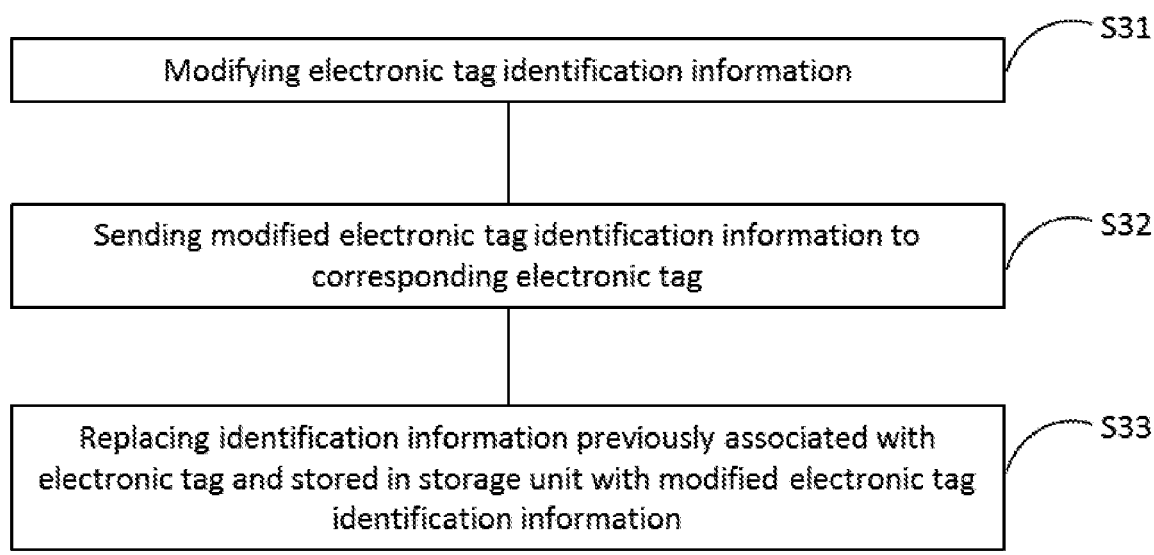
FIG. 15 shows a flow chart of a control method for controlling the electronic tag system according to an embodiment of the present disclosure.

As shown in FIG. 15, the method includes the following steps:

In step S31, the identification information of the electronic tag 01 is modified through a tag editor. For example, the tag editor may be a software application installed on a user terminal (for instance, a computer) that is coupled to the server 03, and the user may modify the identification information of the electronic tag using the tag editor. The tag editor sends the modified identification information to the server 03. The server 03 then sends the modified identification information of the electronic tag 01 to the gateway 02.

In step S32, the modified identification information of the electronic tag is sent, through the gateway 02, to the corresponding electronic tag 01.

More particularly, based on the media access control (MAC) address of the communicator 50 (comprising, for example, a bluetooth chip) of the corresponding electronic tag 01, the gateway 02 sends the modified identification information to the corresponding electronic tag 01.

In step S33, the identification information previously assigned to the electronic tag 01 and stored in the storage unit 60 is replaced by the modified identification information received from the gateway 02.

When the position of a certain electronic tag 01 is changed, the identification information of the electronic tag 01 in the server 03 is modified. The modified identification information is then sent to the electronic tag 01 through the gateway 02 for storage. Consequently, the electronic tag 01 can pair article identification information based on the modified identification information of the electronic tag, and display the product information corresponding to the article identification information.

In some embodiments, before the modified identification information is sent to the electronic tag 01 through the gateway 02, if the electronic tag 01 is in the power-saving mode, the control method may further include a step of waking up the electronic tag through the server 03. The control method according to the present disclosure reduces the risk of misoperation by users other than an authorized administrator of the electronic tag. When operation of the electronic tag needs to be resumed, the authorized administrator can wake the electronic tag from power-saving mode.

A person of ordinary skill in the art can readily understand that all or part of the steps of the control method according to the present disclosure can be completed through hardware programmed to execute specific instructions. The instructions may be stored in a non-transient computer readable storage medium. Executing the instructions executes the steps of the control method according to the present disclosure. The storage medium may be a ROM, a RAM, a magnetic disk, an optical disk, and/or other media capable of storing programs.

In the description of the specification, references made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should covered other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

REFERENCES IN FIGURES

01: electronic tag
02: gateway
03: server
10: housing
11: front surface of housing
12: back surface of housing
13: rear cover
14: slit
15: transparent protective layer 16: switch
20: display screen
30: scanner
40: controller
50: communicator
60: storage unit
70: timer chip

What is claimed is:

1. An electronic tag, comprising:
a scanner configured to scan an article identification information associated with one of a plurality of categories of articles;
a controller configured to acquire the article identification information from the scanner;
a communicator configured to, based on a pairing of the article identification information with an identification information associated with the electronic tag, acquire a product information corresponding to the article identification information;
a storage unit configured to store the identification information associated with the electronic tag; and
a display screen configured to display the product information corresponding to the article identification information,
wherein the identification information associated with the electronic tag corresponds to the one of the plurality of categories of articles, and
wherein the identification information associated with the electronic tag is customizable to correspond to different categories of the plurality of categories of articles, such that the identification information is pairable with article identification information associated with different categories of the plurality of categories of articles.

2. The electronic tag according to claim 1, wherein the storage unit is further configured to store the article identification information and the corresponding product information.

3. The electronic tag according to claim 1, wherein each of the plurality of categories of articles is paired with a single identification information of an electronic tag.

4. The electronic tag according to claim 1, further comprising a housing,
wherein the display screen is provided on an outer surface on a viewer's side of the housing, and
wherein the controller, the communicator, and the storage unit are inside the housing.

5. The electronic tag according to claim 4, further comprising a slit on the outer surface on the side of the housing opposite from the display screen,
wherein the scanner is inside the housing and a position of the scanner corresponds to a position of the slit.

6. The electronic tag according to claim 5, further comprising a transparent protective layer covering the slit.

7. The electronic tag according to claim 1, further comprising a timer chip configured to measure time, and based on a predetermined time, to cause the controller to enter the electronic tag into a power-saving mode.

8. The electronic tag according to claim 1,
wherein the scanner is configured to scan a bar code or a two-dimensional code,
wherein the communicator comprises a bluetooth chip, and
wherein the display screen comprises an electronic ink screen.

9. The electronic tag according to claim 1, wherein the article identification information is a barcode or a two-dimensional code.

10. An electronic tag system comprising:
the electronic tag according to claim 1;
a server; and
a gateway,
wherein the communicator is configured to communicate with the server through the gateway, and to transmit the article identification information and the identification information associated with the electronic tag to the server, so that the article identification information is paired with the identification information associated with the electronic tag and the product information corresponding to the article identification information is acquired.

11. A method of controlling the electronic tag according to claim 1, the method comprising;
acquiring a second article identification information associated with one of a plurality of categories of articles;
pairing the second article identification information with an updated identification information associated with the electronic tag;
based on the pairing, acquiring a second product information corresponding to the second article identification information; and
displaying the second product information on the display screen.

12. The method according to claim 11, further comprising storing the second article identification information and the second product information corresponding to the article identification information in the storage unit.

13. The method according to claim 11, further comprising:
creating a backup of a first article identification information previously paired with the identification information associated with the electronic tag, and a first product information corresponding to the first article identification information,
if the second product information is successfully acquired, storing the second article identification information and the corresponding second product information in the storage unit, and
if the second product information is not successfully acquired, displaying an error message on the display screen, deleting the second article identification information, and then after a predetermined time interval, displaying the first product information on the display screen.

14. The method according to claim 11, further comprising, after the display screen displays the second product information, entering the electronic tag into a power-saving mode according to a predetermined timing in the timer chip.

15. The method according to claim 11, further comprising, before acquiring the second article identification information, determining whether the electronic tag is in a power-saving mode,
wherein if the electronic tag is in the power-saving mode, the method is paused, and
wherein if the electronic tag is not in the power-saving mode, the second article identification information is acquired.

16. A method of controlling an electronic tag system according to claim 10, the method comprising:
acquiring an article identification information associated with one of a plurality of categories of articles;

transmitting the article identification information and an identification information associated with the electronic tag to the server;

pairing the article identification information with an identification information associated with the electronic tag;

based on the pairing, acquiring a product information corresponding to the article identification information; and displaying the second product information on the display screen.

17. The method according to claim 16, further comprising:

modifying the identification information associated with the electronic tag;

transmitting the modified identification information from the server to the electronic tag via the gateway;

replacing the identification information associated with the electronic tag with the modified identification information.

18. The method according to claim 16, further comprising:

before acquiring the article identification information, determining whether the electronic tag is in a power-saving mode, and if the electronic tag is in the power-saving mode, waking the electronic tag up through the server.

* * * * *